United States Patent Office 2,938,734
Patented May 31, 1960

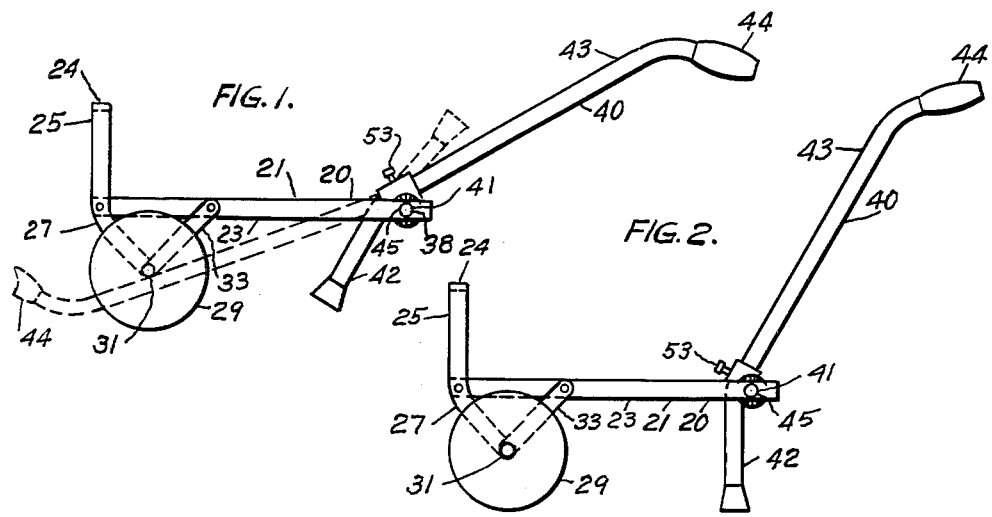
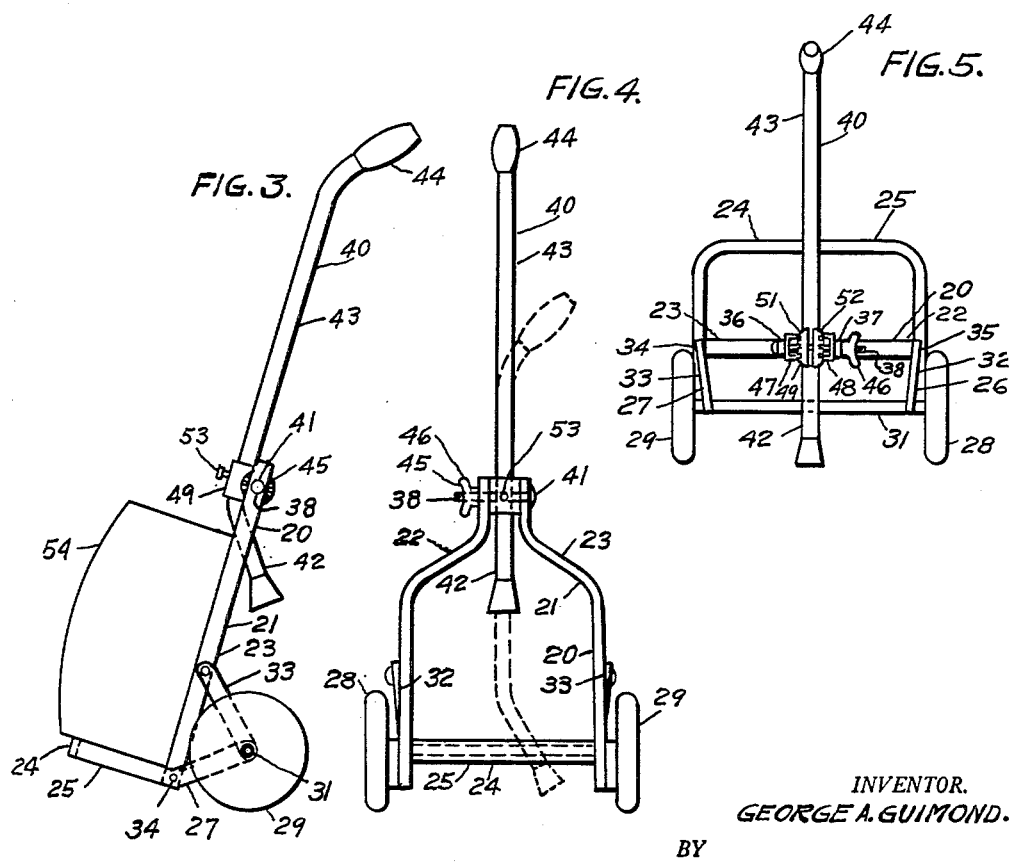

2,938,734

CONVERTIBLE HAND CART

George A. Guimond, 380 Concord St., Manchester, N.H.

Filed Mar. 18, 1958, Ser. No. 722,354

4 Claims. (Cl. 280—30)

This invention relates to a convertible hand truck and table type support. The conventional hand truck or hand cart includes a rigid frame terminating at the lower end in a pair of wheels and at the upper end in a pair of handles. Some such trucks have also been provided with a pair of fixed front legs, in addition to the fixed handles, thereby forming a wheelbarrow or a baggage truck. It is difficult to transport certain loads with such conventional carts for example, a beverage container or the like which must be kept relatively horizontal to avoid spillage. Either the operative must lean over to an uncomfortable position or the truck must be considerably inclined.

It is the principal object of this invention to provide a hand truck with a pivotable combined handle and front leg capable of being clamped at various desired angles to the truck frame. The frame may thus constitute a stationary table, a movable table or an ordinary hand truck.

Another object of the invention is to provide a hand truck especially adapted to move an article such as a beverage cooler through the sand at a beach, the truck handle being relatively high while the truck frame remains substantially horizontal.

A further object of the invention is to provide an improved hand truck in which the frame is open and skeletonized, to receive unwieldy articles such as a barrel, and in which a single, combined handle and front leg is foldable to reduce the length thereof for storage.

Another object of the invention is to produce a simple and inexpensive hand cart capable of being folded into reduced space, capable of serving as a horizontal movable load support and capable of serving as a horizontal stationary table type support.

Other objects and advantages of the invention will be apparent from the claims, the description of the drawing and from the drawing in which Fig. 1 is a side view of the device of this invention in movement, but with the frame horizontal.

Fig. 2 is a view similar to Fig. 1 showing the front leg clamped in stationary table forming position.

Fig. 3 is a side view of the device in use as an ordinary hand truck.

Fig. 4 is a rear view of the device, and

Fig. 5 is a front view of the device shown in Fig. 2.

As shown in the drawing, 20 is the portable, skeletonized frame of the cart 21, the frame 20 being preferably of generally U shape and formed of two bars 22 and 23. Rear leg means 24 includes the opposite rear legs 26 and 27 to which the wheels 28 and 29 are suitably journalled, legs 26 and 27 being part of an inverted U shaped bar 25. Preferably an axle 31 extends transversely between the legs 26 and 27 and a pair of braces 32 and 33 connect the axle with the side bars 22 and 23 of frame 20. The bars 22 and 23 are fixed at 34 and 35 intermediate of the legs 26 and 27 of the U shaped bar 25 and their opposite terminal ends 36 and 37 are connected by a pivot bolt 38.

Combined handle and front leg means 40 is pivotally mounted at 41 intermediate of the length thereof, on the bolt 38. Means 40 includes front leg 42, equal in length to the height of the rear leg means 24, on one side of the pivotal connection 41. Means 40 also includes the handle 43 on the other side of pivotal connection 41, the handle 43 being several times longer than front leg 42. Preferably leg 42 and handle 43 are integral and in extension of each other, the handle 43 terminating in a suitable hand grip 44. Preferably also the front leg 42 is angularly bent from handle 43 and handle 43 is similarly bent in the hand grip portion 44, the combined handle and front leg means 40 being circular in cross section.

Clamping means 45 is provided at the pivotal connection 41 and in the embodiment illustrated comprises a wing nut 46 on the pivot bolt 38 and a pair of serrated plates 47 and 48. Clamping means 45 is cooperable with a U shaped member 49 having opposite exterior serrated faces at 51 and 52. The combined handle and leg means 40 is slidable lengthwise in member 49 by means of set screw 53 in order that it may be folded parallel to and between the bars 22 and 23 of frame 20 to occupy reduced space during storage. This capability is shown in dotted lines in Fig. 4.

As shown in Fig. 1 wing nut 46 may be tightened to clamp the serrations of plates 47 and 48 against the serrations of member 49 so that handle 43 and front leg 42 are inclined relative to frame 20. In this position the frame 20 may be moved on wheels 28 and 29 in substantially horizontal position, the front leg not touching the ground and the hand grip 44 sufficiently high to be within easy reach of the operator. In Fig. 2 the clamping means 45 has been tightened with the handle 43 inclined and the front leg 42 normally to frame 20. The cart 21 thus becomes a stationary table with the frame 20 horizontal and the load confined between the handle 43 and the bar 25. In Fig. 3 the clamping means 45 has been tightened with the handle 43 of combined handle and front leg means 40 substantially parallel to, and in extension of the bars 22 and 23 of frame 20, thereby converting the device to an ordinary hand truck capable of transporting a barrel 54 or a similar article. As shown in Fig. 1 the wing nut 46 may be loosened and the combined handle and front leg means 40 swung in means 45 until the handle grip 44 is opposite axle 31. Since the frame 20, preferably forms an open framed or skeletonized platform there is space between the side bars 22 and 23 thereof for the complete rotation of the combined handle and front leg means 40 and the means 40 may also be turned on its own axis into the plane of frame 20 as shown in dotted lines in Fig. 4. The set screw may thus be tightened and the means 40 folded on bolt 38 to a position substantially entirely within frame 20, the clamp means 45 then being tightened. In this condition the cart 21 takes up reduced space in the trunk of an automobile and takes up little more space even if the handle means 40 is merely folded into frame 20 with the front leg 42 and handle 43 in the normal condition shown in full lines in the drawing.

I claim:

1. A hand truck convertible into a table type support said truck comprising a portable, skeletonized frame for carrying a load; rear leg means, including a pair of wheels, fixed to the rearward end of said frame and supporting said end at a spaced distance above ground level; a U shaped member pivotally mounted at the centre of the forward end of said frame; a single, elongated handle secured in said U shaped member for pivoting therewith; a front leg integral with, and in extension of, said handle said front leg being coextensive in length with said rear leg means and supporting said frame horizontally when extending vertically therebelow and clamping means on said frame and member for selectively clamping said handle and leg in hand truck forming position, with the handle disposed substantially horizontal, or in table forming position, with the leg substantially vertical.

2. A combination as specified in claim 1 wherein said handle is axially slidable and turnable on its axis, in said U shaped member and said member includes a set screw for securing said handle against sliding and turning therewithin.

3. A portable frame; rear leg means, including a pair of wheels, at the rearward end of the frame for supporting said frame horizontally at a spaced distance above ground level; a U shaped clamping member pivotally mounted at the forward end of said frame, combined handle and front leg means secured in said member, said front leg being equal in length to the height of said supporting means and said handle being several times longer than said front leg but in extension thereof, clamping means for clamping said member to said frame at a plurality of different angles and set screw means permitting axial sliding and angular turning to said combined handle and leg means in said member.

4. A convertible hand cart and table comprising a framed platform for carrying a load; rear leg means including a pair of wheels, fixed to the rearward end of said platform; a single, clampable member pivotally mounted at the centre of the forward end of said platform; a single combined handle and leg means slidably and turnably mounted in said member; said combined handle and leg means including a front leg equal in length to said rear leg means, for supporting said platform horizontally at a spaced distance above the ground, and a handle of greater length than, and in extension of, said front leg, and clamping means associated with said member for fixing said combined handle and leg means at various positions relative to said member and fixing said member at various positions relative to said frame.

References Cited in the file of this patent

UNITED STATES PATENTS

| | | |
|---|---|---|
| 1,485,179 | Funk | Feb. 26, 1924 |
| 2,394,245 | Koller | Feb. 5, 1946 |
| 2,453,246 | Mosknes | Nov. 9, 1948 |
| 2,472,989 | Skipper et al. | June 14, 1949 |
| 2,582,435 | Howard | Jan. 15, 1952 |
| 2,883,207 | Reich | Apr. 21, 1959 |

FOREIGN PATENTS

| | | |
|---|---|---|
| 806,939 | Germany | June 21, 1951 |